United States Patent
Naruse

(10) Patent No.: US 10,504,017 B2
(45) Date of Patent: Dec. 10, 2019

(54) ANTENNA APPARATUS AND MODULE APPARATUS

(71) Applicant: SONY CORPORATION, Tokyo (JP)

(72) Inventor: Shuto Naruse, Tokyo (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 15/742,285

(22) PCT Filed: Jun. 6, 2016

(86) PCT No.: PCT/JP2016/066797
§ 371 (c)(1),
(2) Date: Jan. 5, 2018

(87) PCT Pub. No.: WO2017/013954
PCT Pub. Date: Jan. 26, 2017

(65) Prior Publication Data
US 2018/0204104 A1 Jul. 19, 2018

(30) Foreign Application Priority Data

Jul. 17, 2015 (JP) .................................. 2015-142634

(51) Int. Cl.
*G06K 19/07* (2006.01)
*G06K 19/073* (2006.01)
(Continued)

(52) U.S. Cl.
CPC . *G06K 19/07345* (2013.01); *G06K 19/07749* (2013.01); *H01Q 1/24* (2013.01); *H01Q 7/00* (2013.01)

(58) Field of Classification Search
None
See application file for complete search history.

(56) References Cited

U.S. PATENT DOCUMENTS 3,852,758 A * 12/1974 Polson ................... H01Q 1/273
343/718
5,055,793 A * 10/1991 Mulcahey ................ G01V 3/06
324/326
(Continued)

FOREIGN PATENT DOCUMENTS

CN 1783894 A 6/2006
CN 104466363 A 3/2015
(Continued)

OTHER PUBLICATIONS

Extended European Search Report of EP Patent Application No. 16827518.8, dated Dec. 6, 2018, 07 pages.
(Continued)

*Primary Examiner* — Christle I Marshall
(74) *Attorney, Agent, or Firm* — Chip Law Group

(57) ABSTRACT

[Object] To provide an antenna apparatus which can allow a user to freely select service which utilizes the electromagnetic field communication technology. [Solution] Provided is an antenna apparatus including: a first antenna configured to generate a magnetic field by flow of a current; and a module unit including a second antenna whose opening area is smaller than an opening area of the first antenna and which is able to be electromagnetically coupled with the first antenna, and a module configured to operate by a current generated by the second antenna through electromagnetic coupling between the first antenna and the second antenna. The module unit is able to be attached to and removed from the first antenna.

18 Claims, 8 Drawing Sheets

(51) Int. Cl.
    *H01Q 1/24*     (2006.01)
    *H01Q 7/00*     (2006.01)
    *G06K 19/077*     (2006.01)

(56) References Cited

U.S. PATENT DOCUMENTS

| | | |
|---|---|---|
| 6,837,438 B1 | 1/2005 | Takasugi et al. |
| 2005/0189945 A1* | 9/2005 | Reiderman ............ G01V 3/28 |
| | | 324/333 |
| 2014/0266624 A1* | 9/2014 | Van Bosch ............ G06K 7/087 |
| | | 340/10.1 |
| 2016/0110639 A1* | 4/2016 | Finn ................ G06K 19/07788 |
| | | 235/439 |
| 2017/0277990 A1* | 9/2017 | Tokunaga ............ G06K 19/077 |
| 2018/0174015 A1* | 6/2018 | Destraves ................ H04B 1/24 |

FOREIGN PATENT DOCUMENTS

| | | |
|---|---|---|
| JP | 2003-208572 A | 7/2003 |
| JP | 2012-108843 A | 6/2012 |

OTHER PUBLICATIONS

International Search Report and Written Opinion of PCT Application No. PCT/JP2016/066797, dated Aug. 23, 2016, 08 pages of ISRWO.

Office Action for CN Patent Application No. 201680040664.8, dated Aug. 5, 2019, 07 pages of Office Action and 09 pages of English Translation.

\* cited by examiner

ANTENNA APPARATUS AND MODULE APPARATUS

CROSS REFERENCE TO RELATED APPLICATIONS

This application is a U.S. National Phase of International Patent Application No. PCT/JP2016/066797 filed on Jun. 6, 2016, which claims priority benefit of Japanese Patent Application No. JP 2015-142634 filed in the Japan Patent Office on Jul. 17, 2015. Each of the above-referenced applications is hereby incorporated herein by reference in its entirety.

TECHNICAL FIELD

The present disclosure relates to an antenna apparatus and a module apparatus.

BACKGROUND ART

In recent years, a non-contact integrated circuit (IC) card which can perform communication with a reader/writer (or an information processing apparatus having a reader/writer function) in a non-contact manner is in widespread use. The reader/writer performs communication with the non-contact IC card using a magnetic field of a specific frequency such as, for example, 13.56 MHz as a carrier wave. Specifically, the reader/writer can perform communication with the non-contact IC card by the reader/writer transmitting a carrier wave on which a carrier wave signal is placed and the non-contact IC card which receives the carrier wave at an antenna returning a response signal for the carrier wave signal received through load modulation.

Further, the non-contact IC card can be driven using a voltage (inductive voltage) which is generated in accordance with a magnetic field when a magnetic field generated from the reader/writer passes through a communication antenna, as a power source. Therefore, the non-contact IC card can perform various kinds of processing relating to communication with the reader/writer without the need for another power source. Further, a technology in which a case where a user possesses a plurality of non-contact IC cards is taken into account has also been proposed (see Patent Literatures 1, 2, etc.).

CITATION LIST

Patent Literature

Patent Literature 1: JP 2000-174539A
Patent Literature 2: JP 2009-64387A

DISCLOSURE OF INVENTION

Technical Problem

However, it is considered that, in the future, instead of a form like a card, an apparatus which can be worn on the body of a user, that is, a so-called wearable device may become popular. By an electromagnetic field communication technology like non-contact communication between the reader/writer and the non-contact IC card being applied to an apparatus like a wearable device, usage scenes of the apparatus largely expand. In the case where the electromagnetic field communication technology is applied to such an apparatus, it is preferable that the user can freely select service to be utilized.

Therefore, the present disclosure proposes new and improved antenna apparatus and module apparatus which can allow a user to freely select service which utilizes the electromagnetic field communication technology.

Solution to Problem

According to the present disclosure, there is provided an antenna apparatus including: a first antenna configured to generate a magnetic field by flow of a current; and a module unit including a second antenna whose opening area is smaller than an opening area of the first antenna and which is able to be electromagnetically coupled with the first antenna, and a module configured to operate by a current generated by the second antenna through electromagnetic coupling between the first antenna and the second antenna. The module unit is able to be attached to and removed from the first antenna.

Further, according to the present disclosure, there is provided an antenna apparatus including: a first antenna configured to generate a magnetic field by flow of a current; and a module unit including a second antenna whose opening area is smaller than an opening area of the first antenna and which is able to be electromagnetically coupled with the first antenna, and a module configured to operate by a current generated by the second antenna through electromagnetic coupling between the first antenna and the second antenna. An opening portion of the second antenna is provided so as to allow the magnetic field generated by the first antenna to pass.

Further, according to the present disclosure, there is provided a module apparatus including: a second antenna whose opening area is smaller than an opening area of a first antenna configured to generate a magnetic field by flow of a current and which is able to be electromagnetically coupled with the first antenna. The module apparatus operates by a current generated by the second antenna through electromagnetic coupling with the first antenna, and is able to be attached to and removed from the first antenna.

Advantageous Effects of Invention

As described above, according to the present disclosure, it is possible to provide new and improved antenna apparatus and module apparatus which can allow a user to freely select service which utilizes an electromagnetic field communication technology.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
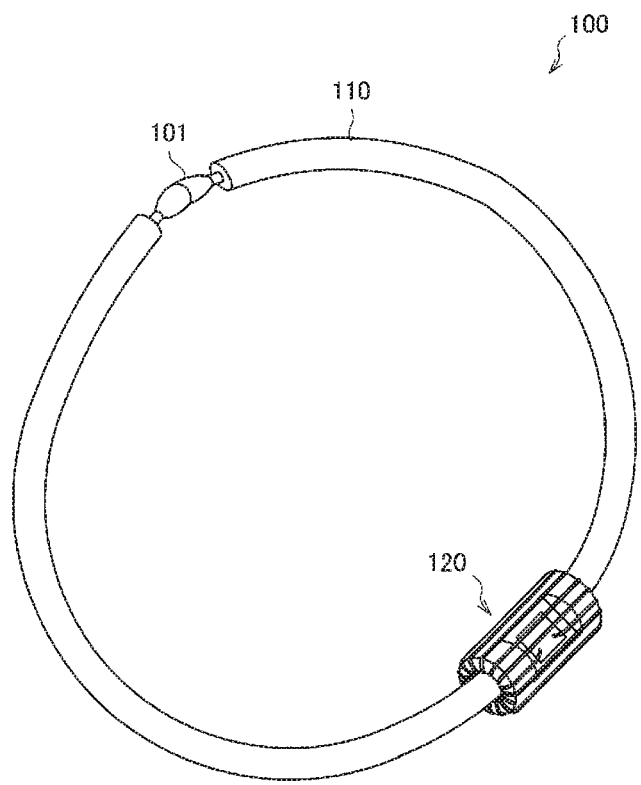
FIG. 1 is an explanatory diagram illustrating an appearance example of an antenna apparatus according to an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of the present disclosure
1.1. Appearance example
1.2. Configuration example of IC module
1.3. Equivalent circuit
1.4. Magnetic field
1.5. Modified example
2. Conclusion 1. First Embodiment 1.1. Appearance Example An appearance example of an antenna apparatus according to an embodiment of the present disclosure will be described first. FIG. 1 is an explanatory diagram illustrating the appearance example of the antenna apparatus according to an embodiment of the present disclosure.

As illustrated in FIG. 1, the antenna apparatus 100 includes a main antenna 110 and an IC module 120.

The main antenna 110 is an example of a first antenna of the present disclosure and is an antenna which causes an inductive current to flow through electromagnetic induction with a reader/writer which is not illustrated. The main antenna 110 is configured to be able to be coupled and separated with a coupling part 101. A size of an opening area in a state where the main antenna 110 is coupled with the coupling part 101 as illustrated in FIG. 1 is not limited to a specific size, but, for example, a size as large as a bracelet, which is a size enough to leave room when an adult wears the antenna apparatus 100 on his/her wrist. Further, the number of turns of the main antenna 110 may be one, or two or more. Note that a capacitor for electromagnetic induction with the reader/writer which is not illustrated is provided at the main antenna 110.

As illustrated in FIG. 1, the IC module 120 has, for example, a cylindrical shape. The IC module 120 which has a cylindrical shape has a hole made at the center, so that the main antenna 110 can pass through the hole. At the IC module 120, a coil antenna having a predetermined number of turns is wound. Further, at the IC module 120, a non-contact IC chip which performs non-contact communication with the reader/writer which is not illustrated is provided. The non-contact IC chip is connected to the coil antenna. A structure of the IC module 120 will be described in detail later.

The main antenna 110 causes an inductive current to flow through electromagnetic induction with the reader/writer which is not illustrated. As a result of the main antenna 110 causing a current to flow, a magnetic field is generated around the main antenna 110. As a result of the magnetic field being generated around the main antenna 110, an inductive current flows in the coil antenna wound around the IC module 120, through electromagnetic induction. Note that a capacitor for electromagnetic induction with the main antenna 110 is provided at the IC module 120.

When a current flows in the coil antenna wound around the IC module 120, power is supplied to the non-contact IC chip provided at the IC module 120. The non-contact IC chip operates by receiving supply of power and executes non-contact communication with the reader/writer which is not illustrated, through magnetic field coupling with the main antenna 110.

That is, the antenna apparatus 100 illustrated in FIG. 1 is an apparatus which operates by the coil antenna provided at the IC module 120 coupling with the main antenna 110 through magnetic field coupling instead of coupling with the reader/writer through magnetic field coupling, and executes non-contact communication between the non-contact IC chip and the reader/writer.

While FIG. 1 illustrates the antenna apparatus 100 including only one IC module 120, the present disclosure is not limited to this example. That is, a plurality of IC modules 120 may be provided at the antenna apparatus 100. By a plurality of IC modules 120 being provided, the antenna apparatus 100 can utilize service corresponding to respective non-contact IC chips. Further, it is also possible to realize non-contact communication between the IC modules 120 via the main antenna 110 as well as communication between the reader/writer and each of the IC modules 120. Further, because the antenna apparatus 100 is configured to be able to be coupled and separated with the coupling part 101, a plurality of IC modules 120 can be easily attached to and removed from the main antenna 110.

1.2. Configuration Example of IC Module

Figure 2:
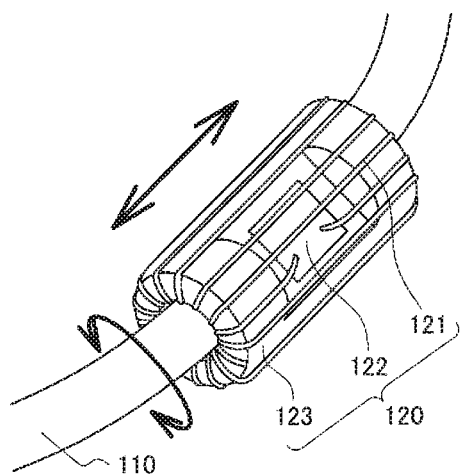
FIG. 2 is an explanatory diagram illustrating an enlarged view of an IC module 120 of an antenna apparatus 100.

Subsequently, a configuration example of the IC module 120 will be described. FIG. 2 is an explanatory diagram illustrating an enlarged view of the IC module 120 of the antenna apparatus 100. As illustrated in FIG. 2, the IC module 120 has a configuration in which a coil antenna 121 and a non-contact IC chip 122 are provided at a module body 123.

The coil antenna 121 is an example of a second antenna of the present disclosure and is an antenna wound around the module body 123 in a shape like a toroidal coil, in which a current flows by electromagnetic induction when a magnetic field is generated around the main antenna 110. While, in FIG. 2, the coil antenna 121 is wound around the module body 123 at substantially equal intervals, a form in which the coil antenna 21 is wound is not limited to this example.

As described above, when the main antenna 10 causes a current to flow by electromagnetic induction with the reader/writer, a magnetic field is generated around the main antenna 110. As a result of the magnetic field being generated around the main antenna 110, an inductive current flows in the coil antenna 121 wound around the module body 123 in a shape like a toroidal coil, through electromagnetic induction.

The non-contact IC chip 122 is a chip which is connected to the coil antenna 121, and, when the coil antenna 121 causes a current to flow, operates by the current and executes non-contact communication processing with the reader/writer.

The module body 123 includes, for example, plastic, and has a shape such that the main antenna 110 penetrates through the module body 123. Further, the module body 123 is configured to be able to freely move along the main antenna 110 and to rotate around the main antenna 110. While a size of the module body 123 is not particularly limited, if an inner diameter of a hollow portion of the module body 123 is made closer to a diameter of the main antenna 110 and an outer diameter is made longer, an opening area of a portion where the coil antenna 121 is wound increases, which can improve communication characteristics of the IC module 120.

By the coil antenna 121 being wound around the module body 123 in a shape like a toroidal coil as illustrated in FIG. 2, even if the module body 123 moves along the main antenna 110, communication characteristics between the non-contact IC chip 122 and the reader/writer are not affected.

Further, by the coil antenna 121 being wound around the module body 123 in a shape like a toroidal coil as illustrated in FIG. 2, even if the module body 123 rotates around the main antenna 110, communication characteristics between the non-contact IC chip 122 and the reader/writer are less likely to be affected.

While, in the example of the IC module 120 illustrated in FIG. 2, the coil antenna 121 is bared, the present disclosure is not limited to this example. The IC module 120 may include a cover which covers the coil antenna 121. A material of the cover which covers the coil antenna 121 may be plastic or may be a metal. Even if a metal is used as the cover which covers the coil antenna 121, because a magnetic field generated by the main antenna 110 is generated inside the cover, an inductive current flowing in the coil antenna 121 is not affected by the metal cover.

A ferrite core may be provided at the module body 123 at the IC module 120 illustrated in FIG. 2. By the ferrite core being provided at the module body 123 at the IC module 120, it is possible to increase inductance, and it is possible to maintain or improve power receiving efficiency even if the number of turns of the coil antenna 121 is reduced.

While it is possible to attach a plurality of IC modules 120 to the main antenna 110, if a plurality of IC modules 120 are attached to the main antenna 110, power is shared among the plurality of IC chips, which makes a communication distance upon non-contact communication shorter than that in a state where only one IC module 120 is attached to the main antenna 110.

Even if a plurality of IC modules 120 are attached to the main antenna 110, the plurality of IC chips rarely perform non-contact communication at the same time. Therefore, as an example of a disabling unit of the present disclosure, for example, a mechanism for disabling a function for each IC module 120 may be provided. As the mechanism for disabling a function for each IC module 120, for example, a mechanical switch, or the like, provided on the coil antenna 121 may be used. The coil antenna 121 may be cut off using a mechanical switch, or the like, so as to prevent an inductive current from flowing. Further, as the mechanism for disabling a function for each IC module 120, a resonant frequency may be shifted by changing capacity of a capacitor linked to the coil antenna 121 using a mechanical switch, or the like. By shifting a resonant frequency to prevent occurrence of electromagnetic induction even if the main antenna 110 generates a magnetic field, it is possible to disable a function for each IC module 120.

The resonant frequencies of the main antenna 110 and the IC module 120 can be adjusted by adjusting inductance of each antenna or adjusting constants of capacitors connected in parallel.

For example, in a state where the IC module 120 is loaded to the main antenna 110 (in a state where the main antenna 110 is coupled with the IC module 120), the respective resonant frequencies of the main antenna 110 and the IC module 120 are adjusted to be around a carrier wave. In the case where the number and characteristics of the IC modules to be loaded are determined in advance, it is preferable to adjust the resonant frequencies using this method.

Further, for example, in a state where the IC module 120 is removed from the main antenna 110, the resonant frequencies of the main antenna 110 and the IC module 120 are adjusted to be around a carrier wave. In the case where the number and characteristics of the IC modules to be loaded are not determined in advance, it is preferable to adjust the resonant frequencies using this method.

Further, for example, in a state where a dummy module which does not perform non-contact communication is loaded to the main antenna 110, the respective resonant frequencies of the main antenna 110 and the IC module 120 are adjusted to be around a carrier wave. The dummy module simulates influence on the resonant frequencies when the IC module 120 is loaded to the main antenna 110. The dummy module is used to adjust frequency characteristics such as the resonant frequencies by being coupled to the main antenna 110. The dummy module includes a coil and a capacitor, and may further include a resistance load. Therefore, when an IC module 120 is added, by replacing the dummy module with the IC module 120, it is possible to add the IC module 120 without affecting the resonant frequencies. The dummy module may have a configuration which makes a user understand that the module is a module which does not perform non-contact communication by, for example, emitting light.

As a result of the IC module 120 being configured to be able to be attached to and removed from the main antenna 110, in the antenna apparatus 100 according to an embodiment of the present disclosure, it is possible to add service supported by an IC provided at the IC module 120 which is added by physically adding the IC module 120.

In the case where it is tried to utilize new service utilizing non-contact communication, in the past, it has been necessary for a user to newly possess a card, or it has been necessary to add service to a card possessed by a user in a software manner. Because, in the antenna apparatus 100 according to an embodiment of the present disclosure, the IC module 120 is connected to the main antenna 110 through magnetic field coupling, it is possible to make the IC module 120 to be newly added substantially smaller than an independent card.

Further, in the case where service is added or deleted through software, in the past, it has been necessary to, for example, authenticate a reader/writer and a device, and service cannot be easily added or deleted. Because, in the antenna apparatus 100 according to an embodiment of the present disclosure, service can be selected by attachment and removal of the IC module 120, the user can easily customize service which can be utilized at the device.

In the case where it is assumed that service is added through software, a card requires a memory sufficient to store a plurality of types of service. In this case, it is impossible to add the number of types of service exceeding an upper limit. Further, in the case where only the number of types of service equal to or less than the upper limit is utilized, it means that a memory is provided superfluously. Because, in the antenna apparatus 100 according to an embodiment of the present disclosure, one IC is used in each type of service, it is only necessary to provide a minimum amount of memory at the IC module 120 in accordance with each type of service.

Because there is no change in hardware such as a surface of a card in the case where service is added through software, a type of service cannot be identified from the appearance. Because, in the antenna apparatus 100 according to an embodiment of the present disclosure, IC modules 120 corresponding to respective types of service exist, it becomes easy for the user to identify the type of service from appearance.

1.3. Equivalent Circuit Example

Figure 3:
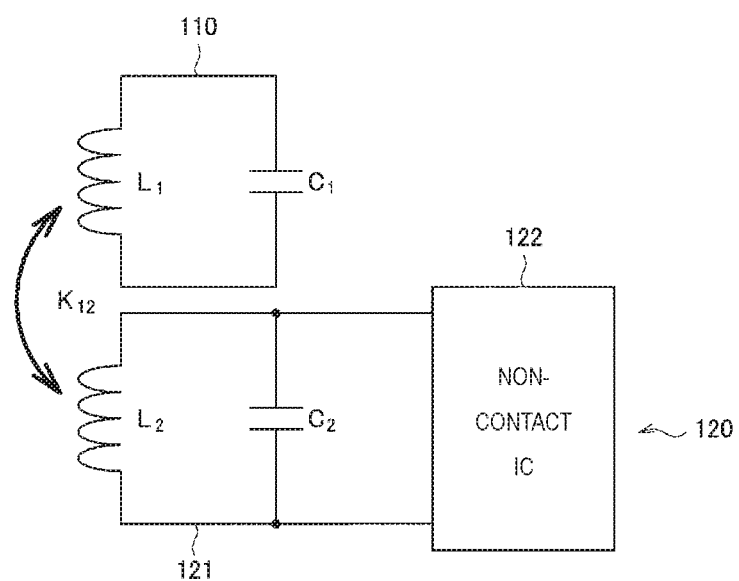
FIG. 3 is an explanatory diagram illustrating an equivalent circuit of the antenna apparatus 100 illustrated in FIG. 1.

Subsequently, an equivalent circuit of the antenna apparatus 100 illustrated in FIG. 1 will be described. FIG. 3 is an explanatory diagram illustrating the equivalent circuit of the antenna apparatus 100 illustrated in FIG. 1.

The main antenna 110 has a coil of inductance $L_1$ and a capacitor of capacitance $C_1$. Further, the IC module 120 has a coil antenna 121 of inductance $L_2$ and a capacitor of capacitance $C_2$. A coupling coefficient of the main antenna 110 and the coil antenna 121 is $k_{12}$.

When a current flows in the main antenna 110, a magnetic field is generated, and an inductive current flows in the coil antenna 121 by the magnetic field generated by the main antenna 110. When an inductive current flows in the coil antenna 121, power is supplied to the non-contact IC chip 122, so that the non-contact IC chip 122 can operate.

A peak of frequency characteristics of a resonant circuit including the main antenna 110 alone may be designed to be in the vicinity of a carrier wave frequency of radio communication, or may be designed to be a frequency higher or lower than the carrier wave frequency of radio communication. Further, a peak of frequency characteristics when the IC module 120 is loaded to the main antenna 110 may be designed to be in the vicinity of the carrier wave frequency of radio communication. Note that in the case where there occur a plurality of peaks of frequency characteristics, one of the peaks may be designed to be in the vicinity of the carrier wave frequency of radio communication.

1.4. Magnetic Field

Figure 4:
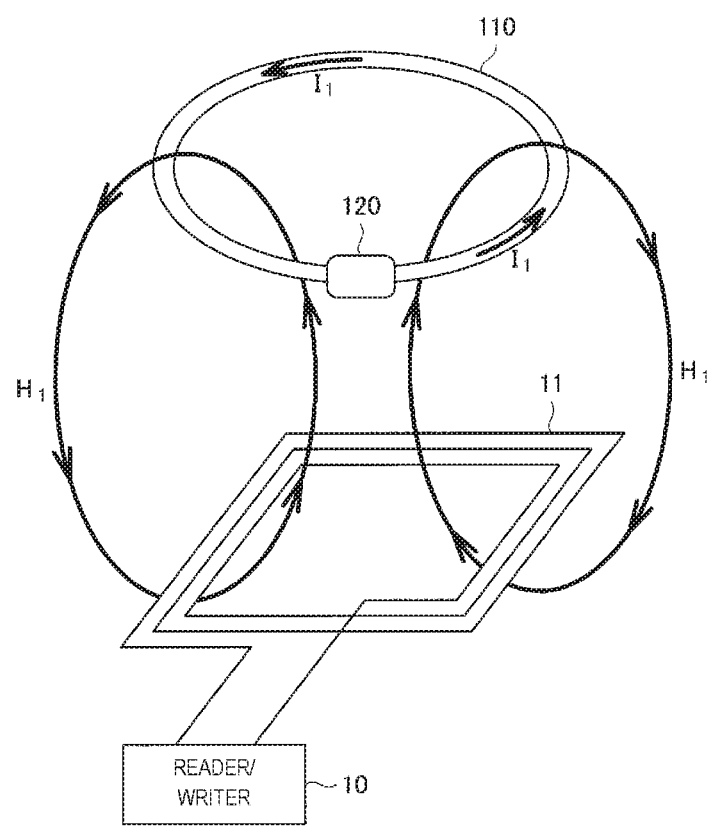
FIG. 4 is an explanatory diagram schematically illustrating a magnetic field generated around the antenna apparatus 100.
Figure 5:
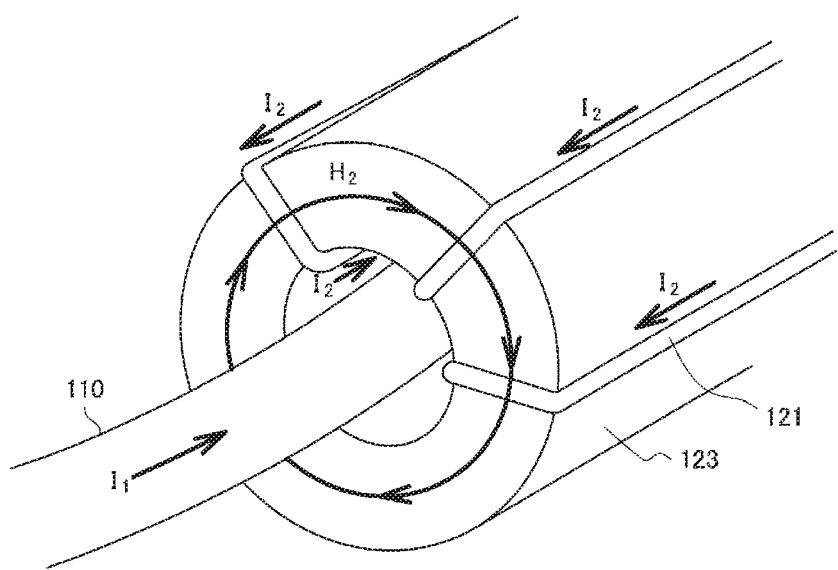
FIG. 5 is an explanatory diagram schematically illustrating a magnetic field generated around the antenna apparatus 100.

Subsequently, a magnetic field generated around the antenna apparatus 100 illustrated in FIG. 1 will be schematically described. FIG. 4 and FIG. 5 are explanatory diagrams schematically illustrating the magnetic field generated around the antenna apparatus 100 with lines of magnetic flux.

When a current flows in a loop antenna 11 of the reader/writer 10, as illustrated in FIG. 4, the loop antenna 11 generates a magnetic field $H_1$. By the magnetic field $H_1$ generated by the loop antenna 11 passing through an opening portion of the main antenna 110, an inductive current $I_1$ flows in the main antenna 110. FIG. 4 illustrates only two lines of magnetic flux to simplify the explanation.

When the inductive current $I_1$ flows in the main antenna 110, as illustrated in FIG. 5, the main antenna 110 generates a magnetic field $H_2$. FIG. 5 illustrates only one line of magnetic flux to simplify the explanation. By the magnetic field $H_2$ generated by the main antenna 110 passing through an opening portion of the coil antenna 121, an inductive current $I_2$ flows in the coil antenna 121.

As illustrated in FIG. 4 and FIG. 5, the opening portion of the coil antenna 121 is provided so as to allow the magnetic field generated by the main antenna 110 to pass. That is, as illustrated in FIG. 4 and FIG. 5, when a current flows in the loop antenna 11 of the reader/writer 10, and the magnetic field $H_1$ generated by the loop antenna 11 passes through the opening portion of the main antenna 110, the inductive current $I_2$ eventually flows in the coil antenna 121. The non-contact IC chip 122 operates by the inductive current $I_2$ caused to flow by the coil antenna 121, and non-contact communication between the reader/writer 10 and the non-contact IC chip 122 is performed.

1.5. Modified Examples

Subsequently, modified examples of the antenna apparatus and the IC module will be described.

Figure 6:
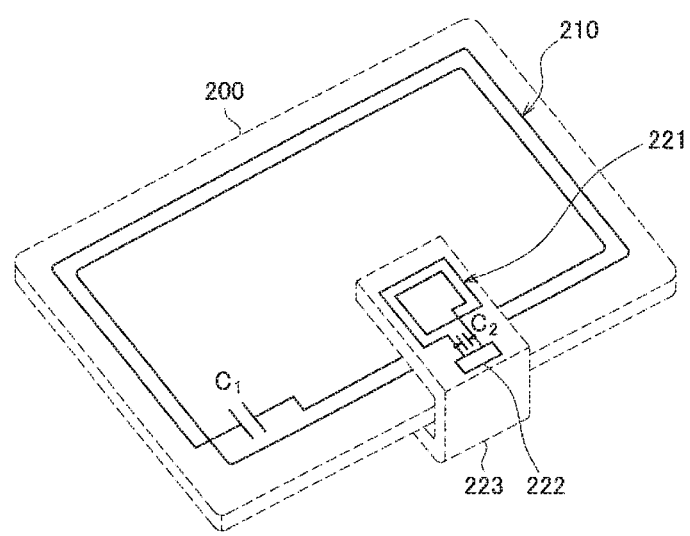
FIG. 6 is an explanatory diagram illustrating appearance of an antenna apparatus 200.

A modified example of the antenna apparatus will be described first. FIG. 6 is an explanatory diagram illustrating appearance of the antenna apparatus 200. In the antenna apparatus 200 illustrated in FIG. 6, a main antenna 210 is formed on a card 201 which is formed with plastic, and an IC module 220 is formed in a clip shape so as to nip the card 201. The IC module 220 has a coil antenna 221 and a non-contact IC chip 222.

In the antenna apparatus 200 illustrated in FIG. 6, when an opening portion of the main antenna 210 allows the magnetic field generated by the reader/writer to pass, an inductive current flows in the main antenna 210. When the inductive current flows in the main antenna 210, by the magnetic field generated by the main antenna 210 passing through an opening portion of the coil antenna 221, an inductive current I flows in the coil antenna 221.

The non-contact IC chip 222 operates by the inductive current I flowing in the coil antenna 221, so that non-contact communication can be performed between the reader/writer and the non-contact IC chip 222.

Because, also in the antenna apparatus 200 illustrated in FIG. 6, the IC module 220 is formed in a clip shape so as to nip the card 201, it is easy to attach and remove the IC module 220 to and from the card 201. Therefore, by the user attaching and removing the IC module 220 to and from the card 201, in the antenna apparatus 200, it is possible to utilize service corresponding to the non-contact IC chip provided at each IC module 220.

Subsequently, a modified example of the IC module will be described. FIG. 7 to FIG. 10 are each an explanatory diagram illustrating appearance of an IC module which can be loaded to the main antenna 110 illustrated in FIG. 1.

Figure 7:
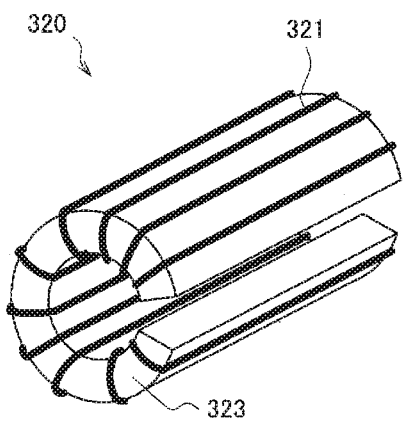
FIG. 7 is an explanatory diagram illustrating appearance of an IC module which can be loaded at a main antenna 110 illustrated in FIG. 1.

FIG. 7 illustrates an appearance example of an IC module 320 in which a slit is provided in a longitudinal direction of a module body 323. A coil antenna 321 is wound around the module body 323 in a shape like a toroidal coil in a similar manner to the IC module 120 illustrated in FIG. 2. By the slit being provided in the longitudinal direction of the module body 323, it becomes easy to attach and remove the IC module 320 to and from the main antenna 110 without separating the main antenna 110 with the coupling part 101. Further, by the slit being provided in the longitudinal direction of the module body 323, it is possible to realize disabling of a function of the IC module 320 by inserting a metal plate at a slit portion.

Figure 8:
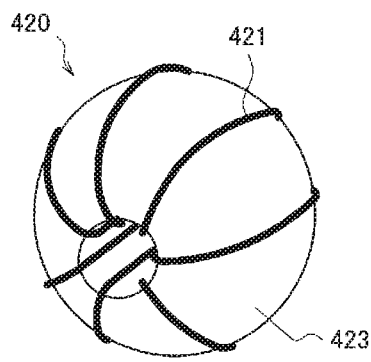
FIG. 8 is an explanatory diagram illustrating appearance of an IC module which can be loaded at the main antenna 110 illustrated in FIG. 1.

FIG. 8 illustrates an appearance example of an IC module 420 which has a module body 423 having a spherical shape. A coil antenna 421 is wound around the module body 423 in a shape like a toroidal coil in a similar manner to the IC module 120 illustrated in FIG. 2. In the antenna apparatus according to an embodiment of the present disclosure, by forming the module body, for example, in a spherical shape as illustrated in FIG. 8 as well as forming the module body in a cylindrical shape, it is possible to improve designability as the whole antenna apparatus.

Figure 9:
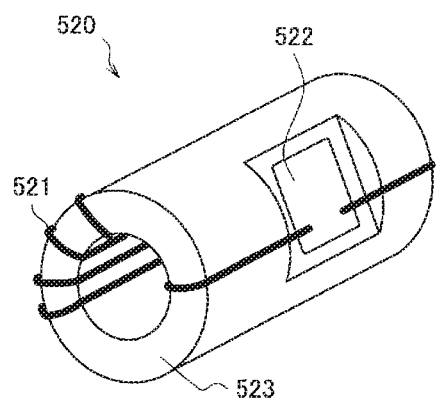
FIG. 9 is an explanatory diagram illustrating appearance of an IC module which can be loaded at the main antenna 110 illustrated in FIG. 1.

FIG. 9 illustrates an appearance example of an IC module 520 in which a coil antenna 521 is wound around a module body 523 with bias provided. In the case where the coil antenna 521 is wound around the module body 523 with bias provided, even if the number of turns of the coil antenna 521 is reduced compared to the number of turns of the coil antenna 121 of the IC module 120 in FIG. 2, it is possible to secure inductance equivalent to that of the IC module 120 in FIG. 2. It is possible to reduce resistance of the whole coil antenna 521 by reducing the number of turns of the coil antenna 521. In the case where the coil antenna 521 is wound around the module body 523 with bias provided as illustrated in FIG. 9, the coil antenna 521 may be wound so that the coil antenna 521 does not cover the non-contact IC chip 522. By winding the coil antenna 521 so that the coil antenna 521 does not cover the non-contact IC chip 522, it is possible to improve communication performance of the non-contact IC chip 522.

Figure 10:
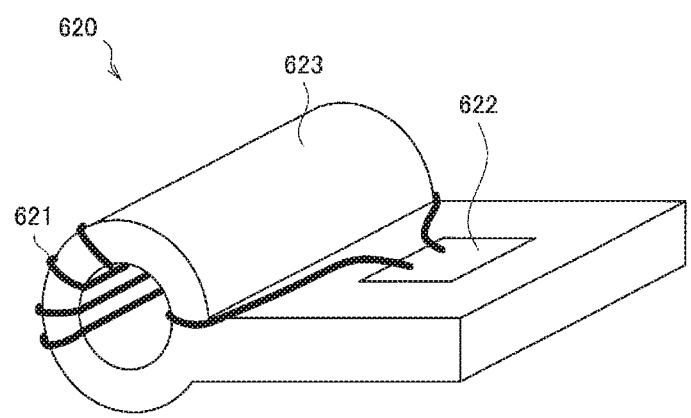
FIG. 10 is an explanatory diagram illustrating appearance of an IC module which can be loaded at the main antenna 110 illustrated in FIG. 1.

FIG. 10 illustrates an appearance example of an IC module 620 which has a module body 623 having bias in a shape. By providing bias in a shape of the module body 623, when the IC module 620 is loaded to the main antenna 110, center of gravity of the module body 623 becomes stable, and rotation is suppressed. As a result of the center of gravity of the module body 623 becoming stable and rotation being suppressed, it is possible to suppress degradation of communication performance of the non-contact IC chip 622 when the main antenna 110 loaded with the IC module 620 is passed over the reader/writer.

A structure of the IC module in the present disclosure is not limited to the above-described structures. For example, while FIG. 7 illustrates an appearance example of the IC module 320 in which a slit is provided at the module body 323, for example, the IC module may have a structure in which a width of the slit at the module body is made as small as possible, a stopper is provided, and a hinge-like object is provided at an opposite side of the slit, so that the IC module can be easily removed from the main antenna 110 by removing the stopper.

In the above-described examples, the main antenna 110 causes an inductive current to flow by a magnetic field generated by the reader/writer 10. Subsequently, an example of an antenna apparatus will be described which causes inductive currents at other modules by a module having a built-in battery being loaded to the main antenna 110 to cause an inductive current to flow in the main antenna 110.

Figure 11:
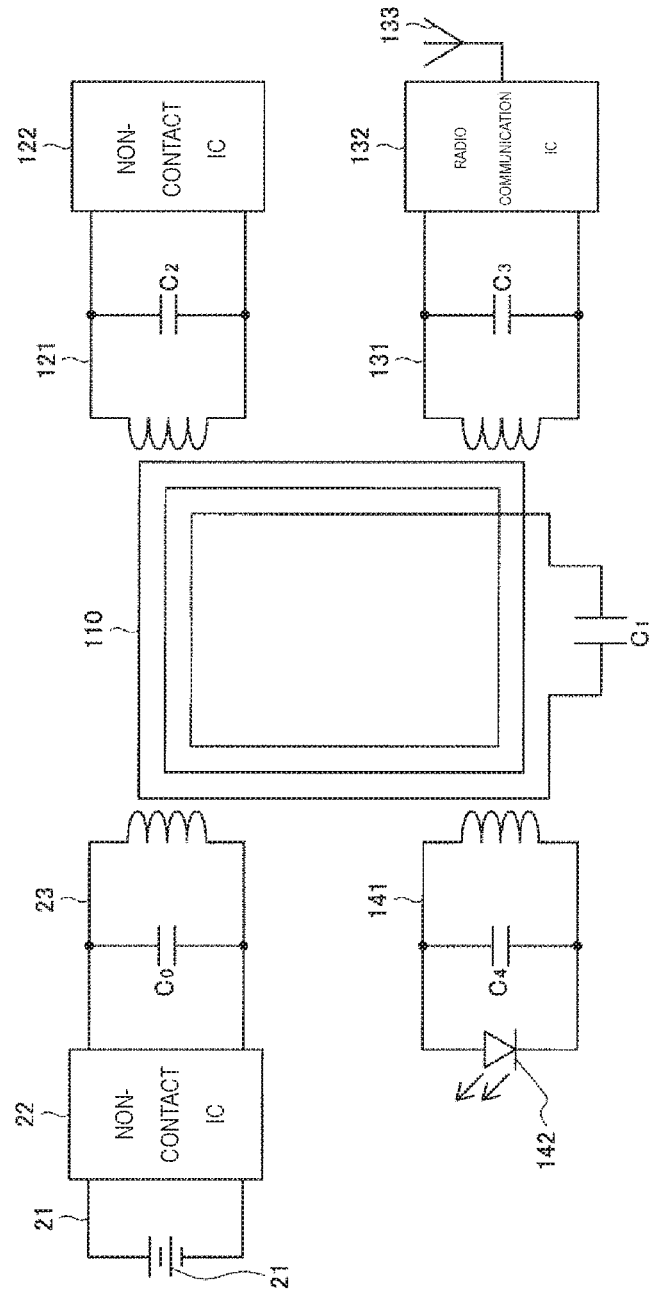
FIG. 11 is an explanatory diagram illustrating a modified example of an antenna apparatus using a circuit diagram.

FIG. 11 is an explanatory diagram illustrating a modified example of the antenna apparatus with a circuit diagram. In the antenna apparatus 100' illustrated in FIG. 11, a module 20 having a built-in battery 21 is loaded to the main antenna 110. The circuit diagram of the antenna apparatus 100' illustrated in FIG. 11 illustrates a state where, in addition to the IC module 120, a communication module 130 which performs radio communication and a light emitting module 140 which emits light using an LED are loaded to the main antenna 110.

The communication module 130 includes a coil antenna 131, a radio communication IC chip 132 and a radio communication antenna 133. The communication module 130 performs radio communication using, for example, Bluetooth (registered trademark).

The light emitting module 140 includes a coil antenna 141 and an LED 142. The light emitting module 140 is a module in which the LED 142 emits light when the coil antenna 141 generates an inductive current.

A non-contact IC 22 which operates using power of the battery 21 generates a carrier wave and causes a current to flow in the coil antenna 23. When a current flows in the coil antenna 23, the coil antenna 23 generates a magnetic field. When the magnetic field generated by the coil antenna 23 passes through an opening portion of the main antenna 110, an inductive current flows in the main antenna 110. When the inductive current flows in the main antenna 110, a magnetic field is generated, and inductive currents flow in the coil antennas 121, 131 and 141 by the magnetic field generated by the main antenna 110.

As a result of the inductive current flowing in the coil antenna 121, power is supplied to the non-contact IC chip 122. In a similar manner, by the inductive current flowing in the coil antenna 131, power is supplied to the radio communication IC chip 132, and, by the inductive current flowing in the coil antenna 141, power is supplied to the LED 142.

In the antenna apparatus 100' illustrated in FIG. 11, by the module 20 having the built-in battery 21 being loaded to the main antenna 110 as described above, a magnetic field can be generated at the main antenna 110 by a magnetic field generated by the coil antenna 23 without the antenna apparatus 100' being passed over the reader/writer.

2. Conclusion

As described above, according to the embodiment of the present disclosure, an antenna apparatus is provided which performs non-contact communication, radio communication, or the like, between the reader/writer and the IC by making the IC provided at a module operate by an inductive current in accordance with the magnetic field generated by the main antenna in a state where the module which can be attached to and removed from the main antenna is loaded to the main antenna.

As a result of making it possible to attach and remove the module to and from the main antenna, in the antenna apparatus according to the embodiment of the present disclosure, it is possible to add service supported by the IC provided at the module which is added by physically adding the module.

In the case where it is tried to utilize new service utilizing non-contact communication, in the past, it has been necessary for a user to newly possess a card or it has been necessary to add service to a card possessed by the user in a software manner. In the antenna apparatus according to the embodiment of the present disclosure, because the module is connected to the main antenna through magnetic field coupling, it is possible to make a module to be newly added substantially smaller than an independent card.

Further, in the case where service is added or deleted through software, in the past, because it has been necessary to, for example, authenticate a reader/writer and a device, service cannot be easily added or deleted. In the antenna apparatus according to the embodiment of the present disclosure, because service can be selected through attachment and removal of the module, the user can easily customize service which can be utilized at the device.

In the case where it is assumed that service is added through software, the card requires a memory sufficient to store a plurality of types of service. In this case, it is impossible to add the number of types of service exceeding an upper limit. Further, in the case where only types of service equal to or less than the upper limit are utilized, it means that a memory is provided superfluously. In the antenna apparatus according to the embodiment of the present disclosure, because one IC is used in each type of service, it is only necessary to provide a minimum amount of memory at the module in accordance with each type of service.

When service is added through software, because there is no change in hardware such as a surface of a card, a type of service cannot be identified from appearance. In the antenna apparatus according to the embodiment of the present disclosure, because a module exists for each service, the user can easily identify the type of service from appearance.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An antenna apparatus including:
a first antenna configured to generate a magnetic field by flow of a current; and
a module unit including a second antenna whose opening area is smaller than an opening area of the first antenna and which is able to be electromagnetically coupled with the first antenna, and a module configured to operate by a current generated by the second antenna through electromagnetic coupling between the first antenna and the second antenna,
in which the module unit is able to be attached to and removed from the first antenna.

(2)
The antenna apparatus according to (1),
in which the module is a non-contact IC chip which is able to perform non-contact communication with a reader/writer.

(3)
The antenna apparatus according to (1) or (2),
in which the module unit is able to move along the first antenna.

(4)
The antenna apparatus according to any one of (1) to (3),
in which the second antenna is wound around the module unit.

(5)
The antenna apparatus according to (4),
in which the second antenna is wound around the module unit with bias provided.

(6)
The antenna apparatus according to any one of (1) to (5),
in which a plurality of the module units are provided.

(7)
The antenna apparatus according to (6), further including:
a disabling unit configured to independently disable each of the module units.

(8)
The antenna apparatus according to (7),
in which the disabling unit is a switch to disable each of the module units by cutting off the second antenna.

(9)
The antenna apparatus according to (7),
in which the disabling unit disables each of the module units by changing a resonant frequency.

(10)
The antenna apparatus according to any one of (1) to (9),
in which the module unit has a cylindrical shape.

(11)
The antenna apparatus according to (10),
in which a slit is provided in a longitudinal direction of the module unit.

(12)
The antenna apparatus according to any one of (1) to (9),
in which the module unit has a spherical shape.

(13)
The antenna apparatus according to any one of (1) to (9),
in which the first antenna is provided inside a card, and the module unit is able to be attached to and removed from the card.

(14)
The antenna apparatus according to any one of (1) to (13),
in which the first antenna generates a current by electromagnetic induction using a radio wave from a reader/writer.

(15)
The antenna apparatus according to any one of (1) to (13),
in which the first antenna further includes a battery which causes a current to flow in the first antenna.

(16)
An antenna apparatus including:
a first antenna configured to generate a magnetic field by flow of a current; and
a module unit including a second antenna whose opening area is smaller than an opening area of the first antenna and which is able to be electromagnetically coupled with the first antenna, and a module configured to operate by a current generated by the second antenna through electromagnetic coupling between the first antenna and the second antenna,
in which an opening portion of the second antenna is provided so as to allow the magnetic field generated by the first antenna to pass.

(17)
The antenna apparatus according to (16),
in which the module is a non-contact IC chip which is able to perform non-contact communication with a reader/writer.

(18)
A module apparatus including:
a second antenna whose opening area is smaller than an opening area of a first antenna configured to generate a magnetic field by flow of a current and which is able to be electromagnetically coupled with the first antenna, in which the module apparatus operates by a current generated by the second antenna through electromagnetic coupling with the first antenna, and is able to be attached to and removed from the first antenna.

REFERENCE SIGNS LIST 10 reader/writer
11 loop antenna
20 module
21 battery
23 coil antenna
100, 100' antenna apparatus
101 coupling part
110 main antenna
120 IC module
121 coil antenna
122 non-contact IC chip
123 module body

The invention claimed is:

1. An antenna apparatus, comprising:
a first antenna configured to:
cause a first inductive current to flow based on electromagnetic induction with an external reader/writer, and
generate a magnetic field based on the flow of the first inductive current; and
a module unit that includes:
a second antenna electromagnetically coupled with the first antenna,
wherein an opening area of the second antenna is smaller than an opening area of the first antenna; and
a module which is operated based on a second inductive current generated by the second antenna through the electromagnetic coupling between the first antenna and the second antenna,
wherein the module unit is attachable to and removable from the first antenna.

2. The antenna apparatus according to claim 1, wherein the module is a non-contact integrated circuit (IC) chip configured to execute non-contact communication with the external reader/writer.

3. The antenna apparatus according to claim 1, wherein the module unit is movable along the first antenna.

4. The antenna apparatus according to claim 1, wherein the second antenna is wound around the module unit.

5. The antenna apparatus according to claim 4, wherein the second antenna is wound around the module unit with a bias.

6. The antenna apparatus according to claim 1, further comprising:
a plurality of module units that include the module unit.

7. The antenna apparatus according to claim 6, further comprising:
a disabling unit configured to independently disable each of the plurality of module units.

8. The antenna apparatus according to claim 7, wherein the disabling unit is a switch configured to disable each of the plurality of module units based on a cut off of the second antenna.

9. The antenna apparatus according to claim 7, wherein the disabling unit is further configured to disable each of the plurality of module units based on a change of a resonant frequency.

10. The antenna apparatus according to claim 1, wherein the module unit has a cylindrical shape.

11. The antenna apparatus according to claim 10, wherein a longitudinal direction of the module unit comprises a slit.

12. The antenna apparatus according to claim 1, wherein the module unit has a spherical shape.

13. The antenna apparatus according to claim 1, wherein the first antenna is inside a card, and
the module unit is attachable to and removable from the card.

14. The antenna apparatus according to claim 1, wherein the first antenna is further configured to generate the first inductive current by the electromagnetic induction based on a usage of a radio wave from the external reader/writer.

15. The antenna apparatus according to claim 1, further comprising:
a battery module configured to generate the first inductive current by the electromagnetic induction at the first antenna.

16. An antenna apparatus, comprising:
a first antenna configured to:
cause a first inductive current to flow based on electromagnetic induction with an external reader/writer, and
generate a magnetic field based on the flow of the first inductive current; and
a module unit that includes:
a second antenna electromagnetically coupled with the first antenna,
wherein an opening area of the second antenna is smaller than an opening area of the first antenna; and
a module which is operated based on a second inductive current generated by the second antenna through the electromagnetic coupling between the first antenna and the second antenna,
wherein the opening area of the second antenna is configured to allow the magnetic field generated by the first antenna to pass.

17. The antenna apparatus according to claim 16, wherein the module is a non-contact integrated circuit (IC) chip configured to execute non-contact communication with the external reader/writer.

18. A module apparatus, comprising:
a first antenna which has a first opening area smaller than a second opening area of a second antenna, wherein
the second antenna is configured to:
cause a first inductive current to flow based on electromagnetic induction with an external reader/writer, and
generate a magnetic field based on the flow of the first inductive current, and
the first antenna is electromagnetically coupled with the second antenna,
the module apparatus is configured to operate based on a second inductive current generated by the first antenna through the electromagnetic coupling with the second antenna, and
the module apparatus is attachable to and removable from the second antenna.

* * * * *